US010200464B2

United States Patent
Quan et al.

(10) Patent No.: US 10,200,464 B2
(45) Date of Patent: Feb. 5, 2019

(54) IN-APP APPLICATION CASTING

(71) Applicant: Razer (Asia-Pacific) Pte. Ltd., Singapore, OT (SG)

(72) Inventors: Justin Quan, San Francisco, CA (US); Jaikumar Ganesh, San Francisco, CA (US); Linda Tong, San Francisco, CA (US); Michael A. Chan, San Francisco, CA (US); Tom Moss, Los Altos, CA (US)

(73) Assignee: Razer (Asia-Pacific) Pte. Ltd., Singapore (SG)

(*) Notice: Subject to any disclaimer, the term of this patent is extended or adjusted under 35 U.S.C. 154(b) by 678 days.

(21) Appl. No.: 14/804,696

(22) Filed: Jul. 21, 2015

(65) Prior Publication Data
US 2015/0326655 A1 Nov. 12, 2015

Related U.S. Application Data

(63) Continuation-in-part of application No. 14/479,140, filed on Sep. 5, 2014, now Pat. No. 9,112,885, which is a continuation-in-part of application No. 13/772,163, filed on Feb. 20, 2013, now Pat. No. 9,106,721.

(60) Provisional application No. 62/067,380, filed on Oct. 22, 2014, provisional application No. 62/027,136, filed on Jul. 21, 2014, provisional application No. (Continued)

(51) Int. Cl.
| | |
|---|---|
| H04L 29/06 | (2006.01) |
| H04L 29/08 | (2006.01) |
| G06F 3/0482 | (2013.01) |
| G06F 17/30 | (2006.01) |
| G06F 21/00 | (2013.01) |

(52) U.S. Cl.
CPC .......... *H04L 67/104* (2013.01); *G06F 3/0482* (2013.01); *G06F 17/30085* (2013.01); *G06F 21/00* (2013.01); *H04L 67/1095* (2013.01); *H04L 67/1097* (2013.01)

(58) Field of Classification Search
CPC ..... G06F 3/0482; G06F 21/00; H04L 67/1095
USPC ..... 709/201, 205, 245, 248; 718/1, 106, 107
See application file for complete search history.

(56) References Cited

U.S. PATENT DOCUMENTS

| | | | | |
|---|---|---|---|---|
| 8,041,348 | B1 * | 10/2011 | Fujisaki | H04M 1/72522 370/486 |
| 2007/0180436 | A1 * | 8/2007 | Travostino | G06F 9/4856 717/138 |

(Continued)

OTHER PUBLICATIONS

"Synchronization of Live Continuous Media Streams"—Christian Blum, Eurecom Institute, Sep. 1994 (Year: 1994) https://pdfs.semanticscholar.org/b058/598e241f5acfc0d92c0174b28a9b0ce6f5fb.pdf.*

*Primary Examiner* — Randy A Scott
(74) *Attorney, Agent, or Firm* — Mattingly & Malur, PC

(57) ABSTRACT

The subject disclosure relates to systems and methods for casting an application from a source device to a destination device. In particular, a process can include steps for causing a source application executing as a foreground process in an operating system of a source computing device to store state data, transmitting the state data of the source application to a set of destination computing devices, and transmitting a cast command to the destination computing device, where the cast command is configured to instruct the destination computing device to execute the source application on the destination computing device using the state data.

27 Claims, 9 Drawing Sheets

Related U.S. Application Data

62/027,245, filed on Jul. 22, 2014, provisional application No. 61/708,794, filed on Oct. 2, 2012.

(56) References Cited

U.S. PATENT DOCUMENTS

| | | | | |
|---|---|---|---|---|
| 2011/0321024 A1* | 12/2011 | Knothe | ............ | G06F 3/0488 717/168 |
| 2012/0096069 A1* | 4/2012 | Chan | ............ | G06F 9/4856 709/203 |

\* cited by examiner

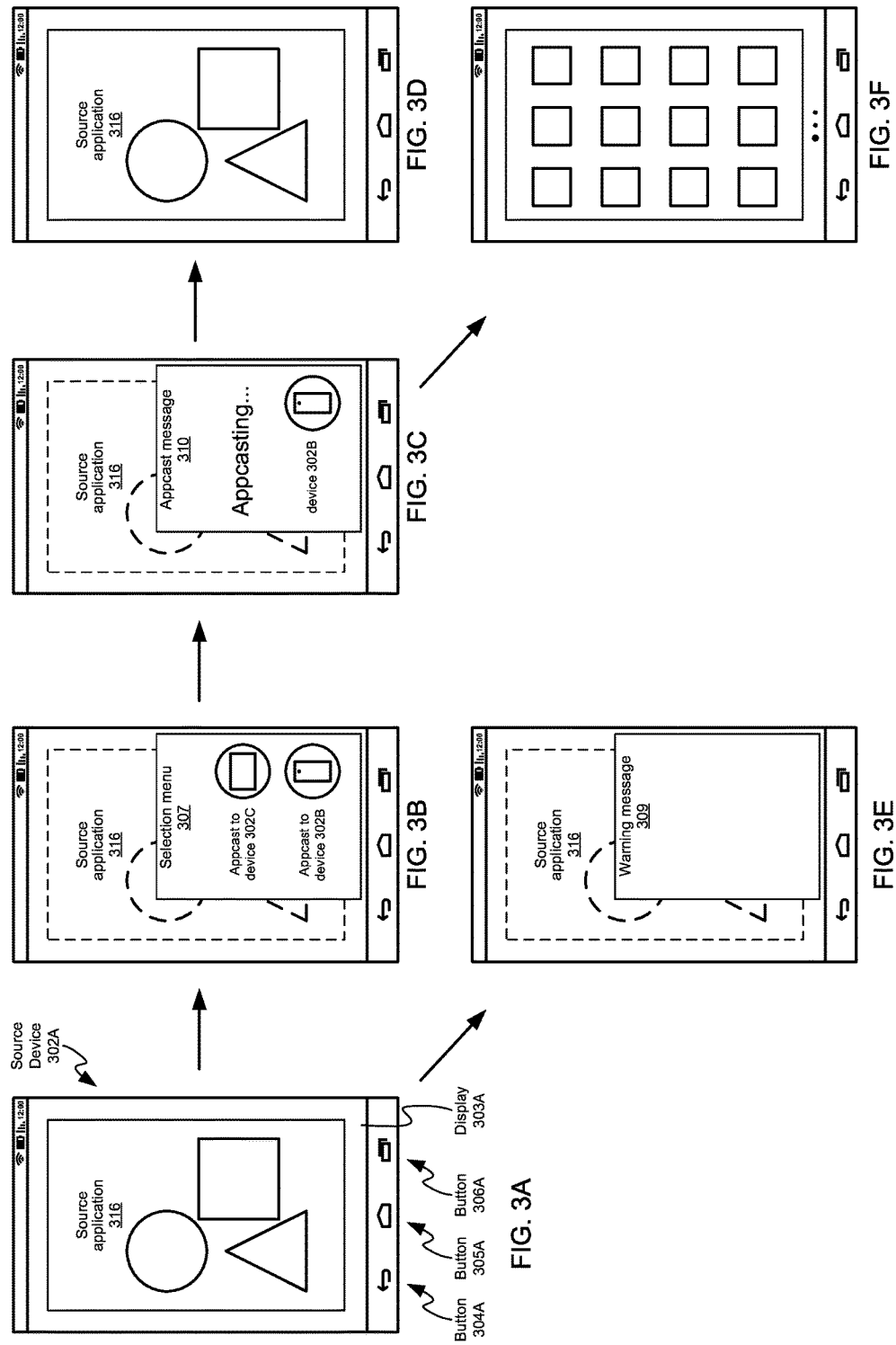

US 10,200,464 B2

IN-APP APPLICATION CASTING

CROSS-REFERENCE TO RELATED APPLICATIONS

This application claims the benefit of U.S. Provisional Application No. 62/067,380, "IN-APP APPLICATION CASTING," filed Oct. 22, 2014, the entire disclosure of which is incorporated by reference herein, in its entirety, for all purposes.

This application is a continuation-in-part of U.S. patent application Ser. No. 14/479,140, entitled "INTERACTIVE MULTI-TASKER", filed on Sep. 5, 2014, the entire disclosure of which is incorporated by reference herein, in its entirety, for all purposes.

In turn, U.S. patent application Ser. No. 14/479,140 is a continuation-in-part of U.S. patent application Ser. No. 13/772,163, entitled "APPLICATION STATE SYNCHRONIZATION ACROSS MULTIPLE DEVICES", filed on Feb. 20, 2013, which claims the benefit of U.S. Provisional Patent Application No. 61/708,794, entitled "CLOUD COMPUTING INTEGRATED OPERATING SYSTEM" filed on Oct. 2, 2012, all of which are incorporated by reference herein, in their entirety, for all purposes.

This application further claims the benefit of U.S. Provisional Patent Application No. 62/027,136, entitled "UNIFIED TASK LIST AND APPLICATION LIST ACROSS USER DEVICES" filed on Jul. 21, 2014 and U.S. Provisional Patent Application No. 62/027,245, entitled "APPLICATION CASTING" filed on Jul. 22, 2014, all of which are incorporated by reference herein, in their entirety, for all purposes.

BACKGROUND

The proliferation of electronic devices has increased the popularity and use of both mobile and non-mobile computing devices. For example, personal computers (PCs), mobile smartphones, tablet computing devices, and smart watches have become popular. As a result, users may own and/or use multiple devices. These devices include various operating systems that support the execution of software applications. For example, users may use these devices to execute web-browsers, email clients, geographical map applications, game applications, or music applications.

BRIEF DESCRIPTION OF THE DRAWINGS

Embodiments of the present invention are illustrated by way of example, and not by way of limitation, in the figures of the accompanying drawings and in which like reference numerals refer to similar elements.

FIGS. 3A-3F illustrate examples of a device and interface that can be used to facilitate application casting, in accordance with one or more embodiments.

Figure 1:
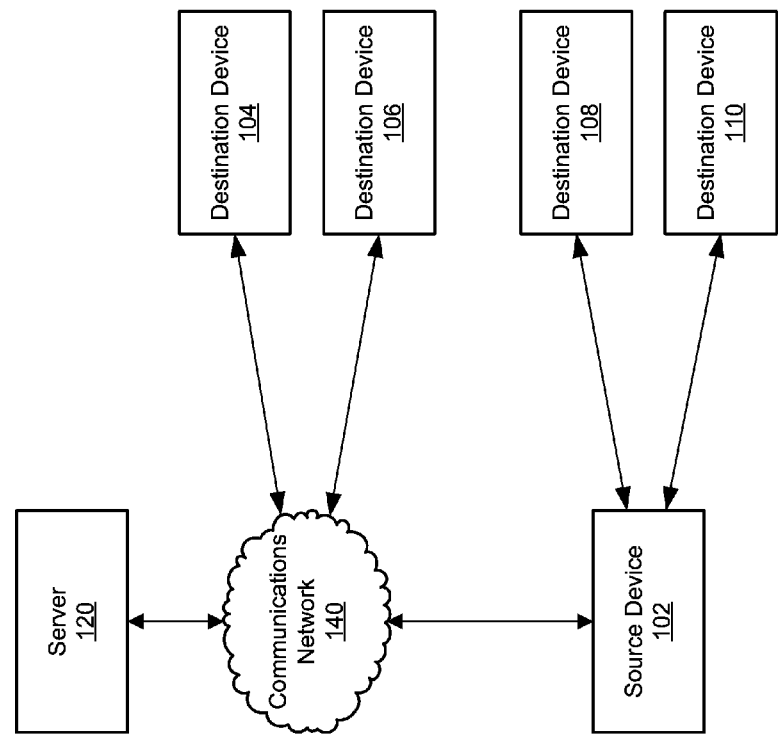
FIG. 1 illustrates an example environment including a source device and multiple destination devices, in accordance with one or more embodiments.

It is understood that other embodiments will become readily apparent to those skilled in the art from the following detailed description, wherein various configurations are shown and described by way of illustration. Accordingly, the detailed description and drawings are to be regarded as illustrative and not restrictive in nature.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

In general, methods and systems provide for "application casting" or "appcasting" (e.g., transmitting, synchronizing, or sharing) application execution from at least one source device to at least one destination device such that application execution can be continued/resumed at the destination device(s) (and in some embodiments, continued/resumed at the source device(s)). The application execution can be casted by transmitting application execution state data from a source device to a destination device. For example, state data for a particular application of a first device (e.g., a source device) can be transmitted to a second device (e.g., a destination device). Once state data for the application is successfully transmitted to the second device, application execution can be resumed by re-initializing an instance of the application on the second device using the state data. As a result, continued and uninterrupted execution of the application may be provided at the second device.

In some embodiments, appcasting may be initiated and/or continued while the source application to be casted is still the foreground application (e.g., actively executed and/or visibly displayed). In other embodiments, appcasting may be initiated and/or continued while the impression that the source application is still the foreground application is provided. As a result, embodiments provide an in-application (or "in-app") appcasting experience.

Syncing of state data may also be performed in a variety of ways, depending on the implementation. For example, syncing can be facilitated by intermediary networks and/or network devices, such as through the Internet using one or more remote servers. In alternative embodiments, syncing may be performed locally (e.g., over devices on a shared private network, such as those connected to a common WiFi network) or on an ad hoc basis (e.g., using radio-frequency (RF) or optical communications). In some embodiments, a combination of intermediary networks, local networks, and/or ad hoc communication channels are used to facilitate casting operations.

FIG. 1 illustrates an example environment 100 including a source device 102, multiple destination devices (104, 106, 108, and 110), a server 120, and a communications network 140. It is understood that aspects of the technology can be implemented using a fewer or greater number of devices (e.g., additional servers, communications networks, and/or servers). Additionally, a fewer or greater number of destination devices may be used without departing from the scope of the instant disclosure. Additionally, the communications network 140 can represent either a private network, such as a local area network (LAN), wide area network (WAN), or a network of networks, such as the Internet. Further, although only one server 120 is illustrated, it should be appreciated that this one server may represent many servers and/or computer systems, arranged in a central or distributed fashion. For example, such servers may be organized as a central cloud and/or may be distributed geographically or logically to edges of a system. It is understood that virtually any number of intermediary networking devices, such as switches, routers, servers, etc., may be used to facilitate communication.

In the example device configuration of the environment 100, each of destination devices 104-110 can be communicatively coupled with the source device 102, for example, using the communications network 140 or via a direct connection including but not limited to: WiFi, Bluetooth®, infrared (IR), radio frequency (RF), etc. Additionally, the source device 102, as well as any of the destination devices 104-110 can be processor-based devices, such as personal computers (PCs) or mobile-devices, such as tablet computers, mobile (smart) phones, personal desktop assistants (PDAs), etc.

In some embodiments, the source device 102 can be used to perform a variety of computing tasks, including using an operating system (e.g., Android OS) to facilitate the execution of applications (e.g., mobile applications or "apps"). In some embodiments, a user of the source device 102 may wish to cast execution of a particular application to another device, such as one of the destination devices 104-110. It should be understood that in some embodiments, execution of the application may also continue at the source device 102 following an appcast operation.

For example, a user of the source device 102 can transmit application execution state data (or a copy thereof) for an application executing on the source device 102 to one or more of the destination devices 104-110, such that the execution of the application may be continued at one or more of the destination devices 104-110. The state data may include information associated with execution state of the application on the source device 102 that one or more of the destination devices 104-110 may use to resume execution of the application.

In some embodiments, the state data may be transferred or synchronized from the source device 102 to the destination devices 104 and/or 106 (e.g., via the server 120 and the communications network 140). For example, the state data may be synchronized from the source device 102 to the destination devices 104-106 by first sending the state data to the server 120 via the communications network 140, which in turn synchronizes the state data with the destination devices 104-106 via the communications network 140.

In some embodiments, the state data may be transferred or synchronized from the source device 102 to the destination devices 108 and/or 110 directly, locally, and/or through an ad hoc network. For example, the state data may be synchronized from the source device 102 to the destination devices 108-110 directly through a radio frequency (RF) communication channel (e.g., WiFi, Bluetooth®, etc.) or an optical communication channel (e.g., infrared (IR) communications).

Figure 2:
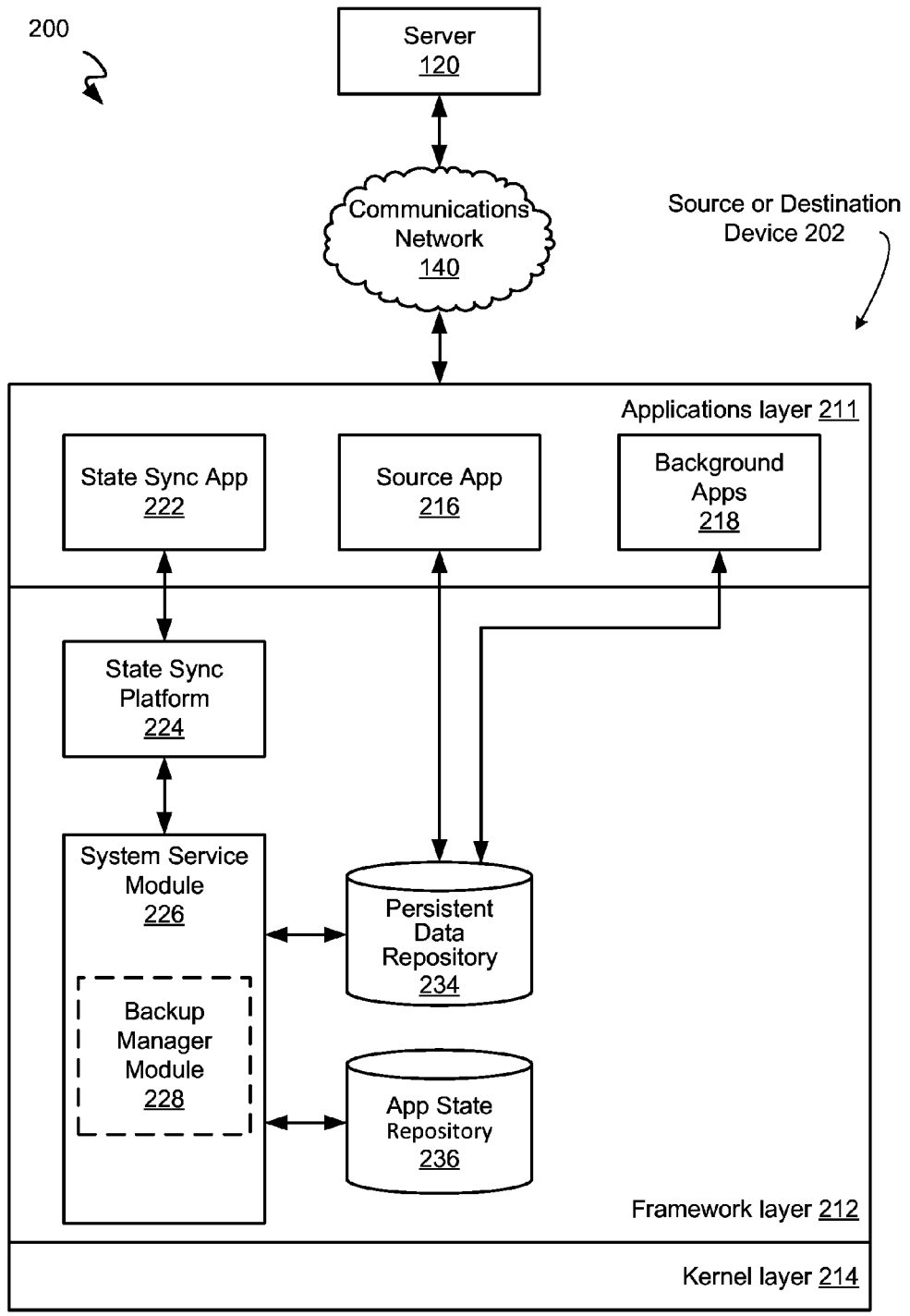
FIG. 2 illustrates an example environment implementing a source/destination device, in accordance with one or more embodiments.

FIG. 2 illustrates an example of various software modules that can be used to implement a source or destination device in an environment 200, in accordance with one or more embodiments. The environment 200 includes a device 202 that can represent either a source device or a destination device, as discussed above with respect to the example of FIG. 1. As illustrated, the device 202 includes an operating system (OS) including a stack of software components roughly divided into three layers including an application layer 211, a framework layer 212, and a kernel layer 214.

The application layer 211 may reside at the top of the OS stack, and may be where applications are installed, executing, and/or accessed by users of the device 202. In the provided example, the application layer 211 includes a state sync app 222, a source application 216, and one or more background applications (e.g., background apps 218).

The framework layer 212, which resides below the application layer 211, can provide system-level services to applications of the device 202. In the example of FIG. 2, the framework 212 includes a state sync platform 224, a system service 226 (which includes a backup manager module 228), a persistent state repository 234, and an application state repository 236.

The various modules of the application layer 211 and framework layer 212 may be communicatively coupled to enable the device 202 to send or receive application casts, as discussed in greater detail below. For example, the state sync app 222 may be communicatively coupled with the state sync platform 224, which in turn may be communicatively coupled with system service module 226. Further, both the source application 216 and background applications 218 may be communicatively coupled with the persistent state repository 234. In addition, the system service module 226 (and thereby the backup manager module 228) may be communicatively coupled with the persistent state repository 234 and/or the application state repository 236.

FIGS. 3A-3D illustrate examples of a source device 302A and interface that can be used to facilitate application casting, in accordance with one or more embodiments. The source device 302A may be similar to or the same as the device 202 of FIG. 2. In other words, the source device 302A may include the same or similar components and/or functionality as the device 202. Thus, while discussing the source device 302A, reference will be made to components of the device 202 as though they are components of the source device 302A (e.g., the source device 302A may include the state sync app 222 and/or a source application 316 may be the same as or similar to the source application 216). The source device 302A may include a display 303A and various user input controls (e.g., a back button 304A, return button 305A, and selection button 306A.

FIG. 3A illustrates the source device 302A executing a source application 316 (e.g., a web-browser, an email client, a geographical map application, a gaming application, etc.), which is executed as a foreground process and provided on the display 303A. The source application 316 may be the same as or similar to the source application 216 of FIG. 2 (e.g., it may execute in the applications layer 211 as a foreground application).

In some embodiments, an application (e.g., the source application 216/316 and background applications 218) of the source device 302A may store persistent data in the persistent state repository 234. The persistent state repository 234 may include one or more areas (e.g., "home" directories) each associated with a particular application. The persistent data may include information associated with the execution state of the application (e.g., variables and parameters necessary for the proper ongoing execution of the application). An application may periodically or in some cases continuously update the persistent data during execution and may rely on the persistent data to properly execute. Accordingly, the persistent data may represent, at least in part, the execution state of the application. As a result, if the application is caused to enter a background state or terminated, the application may use the persistent data to continue executing from its previous state.

The persistent data may be persistent because it may persist after a backgrounding of the execution of an application, a termination of the execution of an application, or even when the device is powered off. For example, the persistent data repository 234 may store data in a non-volatile memory that retains information when power is turned off (e.g., NVRAM flash memory, hard drive, etc.). It should be understood that, in some embodiments, the persistent data repository 234 may partially or completely store persistent data in a volatile memory (e.g., DRAM, SRAM, etc.).

In some embodiments, operations used to perform the casting of an application are performed by the state sync app 222 and/or the state sync platform 224. In various embodiments, operations of the state sync app 222 should be understood to involve the state sync platform 224. In other words, when the state sync app 222 carries out an action, it is implicit that the state sync platform 224 may carry out that action in place of or by the request of the state sync app 222. In other embodiments, the state sync platform 224 may operate without the state sync app 222.

The state sync app 222 (and/or the state sync platform 224) may be invoked or executed in response to user input (e.g., a long press of the buttons 304A-306A), or any other indication that syncing/appcasting is to be performed. User input can include but is not limited to input received via a touchscreen, actuation of one or more device (e.g., source/destination device) buttons, voice inputs received via a microphone, visual gestures, etc. Further, user input may be received via various button types. For example, a soft key or button, a hard button, a button displayed on a touchscreen, and so on. In addition, while some examples may be discussed with reference to a "long press" of a button, it is understood that user input other than a long press may initiate an appcast application or routine. For example, a double tap/click, triple tap/click, two consecutive long presses, and so on.

In some device environments (e.g., the Android operating system), resource priority is provided to applications/processes executing in the foreground (e.g., applications/processes that are displayed to a user). In contrast, application threads running in the background (e.g., not immediately visible to the user), are provided with less or no processing resources. For example, application persistent data for some applications is saved, often by the application itself, in response to becoming a background application (e.g., because the application may be terminated and thereby lose its state while being a background application). Alternatively or in addition, the application may regularly save its persistent data. If the application becomes a foreground application once again or re-initialized, state data is used to resume application operation where it was interrupted. That is, state data is used to save information regarding a current application state and used to continue seamless application operation, as if the application were never terminated.

The invocation of the state sync app 222 may cause the state sync app 222 to become the foreground application, and thereby cause the source application 316 to become a background application (e.g., like background apps 218). As discussed above, when a foreground application is subsequently caused to execute in the background, the foreground application's execution state may be at least in part preserved as part of the persistent data.

In some embodiments, the state sync app 222 includes functionality to request the backup manager module 228 to back up the persistent or state data of the source application 316 in the persistent data repository 234. For example, the state sync app 222 may make the backup request upon invocation. In another example, the state sync app 222 may make the backup request after determining that the appcast operation should be continued based on one or more checks (discussed below). As a result, the backup manager module 228 may suspend the execution of the source application 316 and perform the backup operation (as discussed below). In some embodiments, the state sync app 222 may make the request to the state sync platform 224, which may in turn make the request to the backup manager module 228. In some embodiments, the state sync platform 224 may instruct the backup manager module 228 to perform a backup every time an application is backgrounded. In further embodiments, the state sync platform 224 may only instruct the backup manager module 228 to perform a backup based on one or more criteria (e.g., user preferences, user history information, physical proximity or availability of destination devices, etc.).

In some embodiments, the backup manager module 228 includes functionality to back up some or all of the persistent data of the source application 316 (e.g., source application 216). The backup manager module 228 may back up the persistent data associated with the application 316 to the app state repository 236 (which may store data in volatile and/or non-volatile memory). To form the backup, the backup manager module 228 may create a compressed and/or encrypted archive file (e.g., a ZIP or JAR file). Because the persistent data may include various data not necessarily related to the execution state of the application 316, the backup manager module 228 may back up only a subset of the persistent data related to the application execution state (or application "state data"). For example, the backup manager module 228 may omit unneeded "TMP" files when saving the state data. However, in some embodiments, the backup manager module 228 may back up the entirety of the persistent data and the state sync app 222 may cause the entirety or a subset (state data) to be sent.

In some embodiments, the state sync app 222, state sync platform 224, and/or backup manager module 228 can cause or perform incremental backups. For example, instances of the backup manager module 228 on the source and destination devices may track which files of an application have changed between the devices (e.g., by maintaining change lists), and thereby only synchronize those files that have changed.

In addition, the backup manager module 228 may suspend the execution of the application 316 to prevent updating of persistent data while the backup manager module 228 performs a backup operation of the data. In some embodiments, the backup manager module 228 may back up an application's persistent data that is stored in volatile memory (e.g., RAM), whether that data is stored in the persistent data repository 234 or not.

FIG. 3B illustrates the source device 302A with a selection menu 307. The selection menu 307 may be displayed by the state sync app 222. In many operating systems, when another application becomes the foreground application (i.e., the state sync app 222 in this case), the source application 316 is no longer depicted as a foreground application (e.g., no longer displayed). However, in some cases it may be preferable to provide the impression that the source application 316 is still executing as the foreground application, such that the selection menu 307 is an "in-application" interface.

In some embodiments, the state sync app 222 includes functionality to perform/acquire a screen capture (e.g., a take/request a "screenshot" of the source device 302A, display 303A, and/or source application 316). The screen capture may depict the most recent foreground execution state of the source application 316. In some embodiments, the state sync app 222 acquires a screen capture of the source application 316 from a memory location of the source device 302A (e.g., by retrieving/requesting an image frame from a frame buffer of the source device 302A corresponding to the source application 316). In other embodiments, a user interface (UI) of the state sync app 222 can be initially and/or temporarily transparent, such that the source application 316 is visible through the UI of the state sync app 222. In such embodiments, a screen capture of the source application 316 can be captured by the state sync app 222.

Once the state sync app 222 has acquired the screen capture, the state sync app 222 may display the screen capture as a background image of the state sync app 222 and display UI elements of the state sync app 222 superimposed over the background image. The state sync app 222 may apply certain effects to the background image to provide the impression that the source application 316 is executing but temporarily suspended and/or to redirect the user's attention from the background image to the state sync app 222 (e.g., to the selection menu 307). For example, the state sync app 222 may apply a "dim" or "darken" effect, blur effect, etc. (as depicted by the dotted lines in FIGS. 3A-3I). Accordingly, a user may perceive that the state sync app 222 is being performed from within the source application 316 (i.e., the cast will appear as if it is being performed "in-app").

Returning to the selection menu 307, the selection menu 307 may provide a list of destination devices to which the source application 316 may be cast. For example, the selection menu 307 includes options to "appcast to device 302C" or "appcast to device 302B". It is understood that a fewer or greater number of devices may be provided in selection menu 307. For example, destination devices that are unavailable or incompatible can be hidden from the selection menu or aesthetically minimized (e.g., grayed out) to indicate unavailability.

In some embodiments, items provided in a selection menu, such as a list of destination devices, can be based on a list of devices discovered/detected by the casting application (e.g., the state sync app 222). Further, the selection menu may be populated based on device information that is retrieved from a user account or user profile that indicates a number of devices associated with the user. Additionally, the arrangement or order of destination device selections may change based on one or more criteria (e.g., user preferences, user history information, physical proximity or availability of destination devices, etc.).

In some embodiments, a selection menu is not provided. Rather, a cast selection is automatically made, for example, based on the source device's proximity with a car navigation device. That is, automatic cast selections may be made based on one or more factors, including geographic distances between a source device and a destination device, user preferences, and/or a source application context (e.g., a source application providing navigation or map information may be automatically cast to a proximate car navigation system).

FIG. 3E illustrates the source device 302A while displaying a warning message 309 that can be used to alert the user of the source device 302A to potential problems that can be encountered when attempting to cast the source application 316. The state sync app 222 can include functionality to perform one or more checks when it is invoked (e.g., upon a first execution of the state sync app 222, or upon an initialization of the state sync app 222 from a "sleep" or background state). The warning message 309 may then be displayed if an issue is encountered.

For example, the warning message 309 may be used to provide information regarding communication problems with one or more destination devices. In another example, the warning message 309 may be used to provide information indicating an application conflict, for example, between two or more instances or different versions of an application. In another example, the warning message 309 may be used to provide information about appcast compatibility issues.

In a further example, when the state sync app 222 is initialized and the source device 302A is not actively processing a foreground application (i.e., the device is at a "home screen"), the state sync app 222 may determine that there is no foreground application available for casting. As a result, the state sync app 222 may display the warning message 309 and/or return to a sleep state. In some embodiments, the state sync app 222 can also perform one or more checks to determine whether the source application 316 is capable of being cast (e.g., whether the application release version supports casting by the state sync app 222).

In some embodiments, initialization/execution of the state sync app 222 can cause the state sync app 222 to perform one or more checks to determine (or identify) the availability of one or more destination devices. For example, upon a determination that a number of destination devices exist for which an appcast can be performed, the state sync app 222 can facilitate the display of the selection menu 307 indicating the available destination device options. The warning message 309 can also be displayed if a particular destination device is unavailable or if no destination devices are available. Further, in response to a detected communication problem with the source device 302A, the state sync app 222 can provide messages or diagnostic information indicating a lack of connectivity or a type of user action that must be taken to enable connection with a destination device.

In some embodiments, the state sync app 222 may perform one or more checks to determine if a similar (or compatible) casting application software exists on one or more potential destination devices. In one example, if it is determined that a particular destination device lacks compatible casting application software, the warning message 309 may be displayed that further provides the user with an option to install the casting application software (or a proper version of the casting version) on the destination device. In this regard, menus may be displayed on the source device 302A and/or on the destination device 302B to confirm the installation of new and/or updated software.

FIG. 3C illustrates the source device 302A after a selection of a destination device has been received (e.g., via the selection menu 307). The state sync app 222 may provide an appcast message 310 after the selection has been received and while an appcast operation is in progress. As illustrated, the appcast message 310 may display the selected destination device (e.g., device 302B) that was selected in the selection menu 307.

In some embodiments, once the destination device 302B is selected, the source device 302A may begin sending the state data to the server 120, which in turn synchronizes the state data to the destination device 302B (e.g., via the communications network 140). In other embodiments, once the destination device 302B is selected, the source device 302A may send the state data to the destination device 302B without the use of the server 120. For example, the source device 302A may send the state data to the destination device 302B through the communications network 140 or directly.

In some embodiments, the source device 302A may begin sending the state data even before a destination device is selected. For example, the source device 302A may begin sending the state data upon the invocation of the state sync app 222, upon the completion of successful checks, or during the display of the selection menu 307. Further, because the source device 302A may begin sending the state data before a destination device is selected, the source device 302A may distribute a copy of the state data to all potential destination devices (whether directly or through the server 120).

In some embodiments, even when an application is executing as a background process, application persistent/state data can continue to change because some resources may still be provided to the application. In some embodiments, before or during transmitting state data from the source device to the destination device, a hash value of currently stored source application state data can be compared with a hash value of recently stored corresponding state data to determine whether the source application's state data changed during background execution. If it is determined that the hash values do not match (e.g., by the state sync app 222 or state sync platform 224), the currently stored state data may be sent or resent in place of the recently stored state data.

Once the appcast operation is complete, execution of the source application 316 (or an instance thereof) may be resumed on the destination device 302B. However, as illustrated by FIG. 3D, the state sync app 222 on the source device 302A may return foreground execution to the source application 316 so that execution of the source application 316 may also be resumed on the source device 302A, in some embodiments. In other embodiments, as illustrated by FIG. 3F, the state sync app 222 may exit (terminate execution) to return to a home screen of the source device 302A. The behavior of the source device 302A following an appcast operation may be based on one or more criteria (e.g., user preferences, user history information, physical proximity or availability of destination devices, etc.).

In some embodiments, once the source application 316 of the source device 302A has been successfully casted to the destination device 302B, the state sync app 222 may provide an appcast confirmation message (not shown).

Figure 3I:
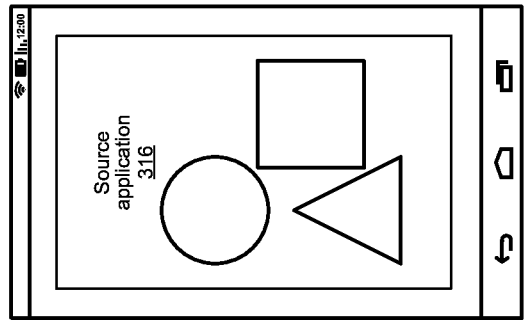
FIGS. 3G-3I illustrate examples of a device and interface that can be used to receive an application cast on a destination device, in accordance with one or more embodiments.
Figure 3H:
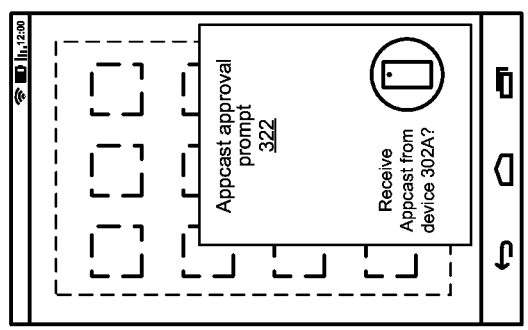
Figure 3G:
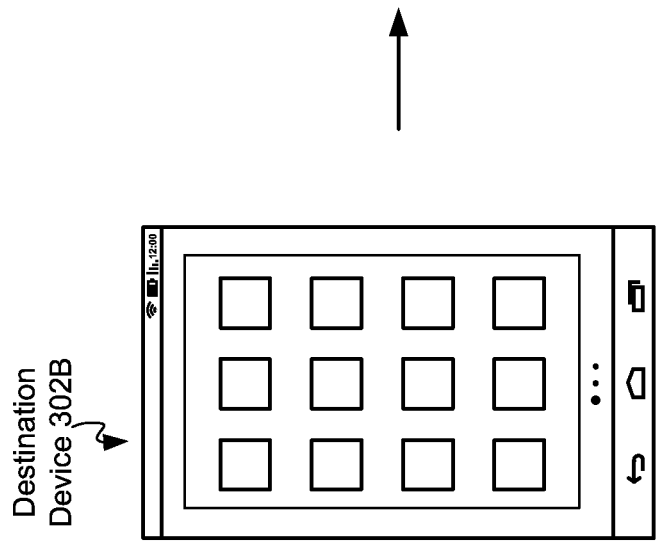

FIGS. 3G-3I illustrate examples of the destination device 302B and interface that can be used to facilitate application casting, in accordance with one or more embodiments. The destination device 302B may be similar to or the same as the device 202 of FIG. 2. In other words, the destination device 302B may include the same or similar components and/or functionality as the device 202. Thus, while discussing the destination device 302B, reference will be made to components of the device 202 as though they are components of the destination device 302B.

While the destination device 302B and the source device 302A may be the same make/model (in some embodiments), it will be understood that the destination device 302B is not the same exact device as the source device 302A. In fact, while the destination device 302B may include the same or similar components and/or functionality as the source device 302A, the destination device 302B may be a tablet while the source device 302A is a mobile phone. Further, it should be understood that references to the state sync app 222 and/or the application state sync platform 224 with relation to the destination device 302B will relate to instances of the state sync app 222 and/or the application state sync platform 224 executing on the destination device 302B. In addition, it should be understood that references to the source application 316 with relation to the destination device 302B will relate to an instance/installation of the source application 316 on the destination device 302B. For example, a different instance of the same source application 316 may be installed on the destination device 302B.

FIG. 3G illustrates the destination device 302B before receiving an appcast. FIG. 3G illustrates a home screen, but the destination device 302B could be on a different screen (e.g., displaying the execution of an application).

FIG. 3H illustrates an example of an appcast approval prompt 322 that can be displayed to verify acceptance of the appcast (e.g., from the source device 302A). An instance of the state sync app 222 and/or the application state sync platform 224 executing on the destination device 302B may receive communications related to the appcast (e.g., an appcast command) from the source device 302A. In response to the communications, the state sync app 222 may begin executing as the foreground application and thereby display the appcast approval prompt 322. The appcast approval prompt 322 may request approval of the appcast from the source device (e.g., the source device 302A). If an appcast operation is approved, the appcast operation may continue. In some embodiments, an appcast approval prompt 322 is not displayed and instead the appcast operation continues without the need for approval.

In some embodiments, the destination device 302B may begin receiving or already have received a copy of the state data from the source device 302A (e.g., via the server 120 using the communications network 140 or directly) even before the destination device 302B was selected for appcasting at the source device 302A (e.g., at the stage of FIG. 3G). In other embodiments, the destination device 302B may begin receiving or already have received a copy of the state data from the source device 302A immediately before, during, or after the display of the appcast approval prompt 322.

In some embodiments, when the appcast operation is approved, or otherwise ready to continue, the backup manager module 228 at the destination device 302B may perform a restore operation to store the state data in the persistent data repository 234 and/or the app state repository 236. For example, when the state data is received, it may be stored in the app state repository 236. The backup manager module 228 may then restore the state data from the app state repository 236 to the persistent data repository 234. The state data may be stored in an area associated with an instance of the source application 316 on the destination device 302B (e.g., a home directory of the source application 316). Because the original state data of an application on the destination device (e.g., an instance of the source application 316) may be overwritten by the new state data transmitted by the source device 302A, in some embodiments, the original state data on the destination device 302B is saved (backed-up) such that it can be later restored to resume original execution once execution using the new state data has completed.

In addition, the backup manager module 228 may terminate or suspend the execution of the source application 316 while the backup manager module 228 performs the restore operation of the data. In another example, the state data is stored directly in the persistent data repository 234 (e.g., to a home directory of the source application 316).

FIG. 3I illustrates an example of a completed appcast operation at the destination device 302B. Once the appcast has been successfully received and restored by the destination device 302B, the state sync app 222 may cause the source application 316 on the destination device 302B to reinitialize. As a result, the source application 316 will execute using the received state data and thereby resume execution at the destination device 302B from the point where it was initially appcasted. FIG. 3I depicts the resumed execution of the source application 316 in a foreground of the destination device 302B.

It should be understood that the execution of an application can be appcasted between devices of different types (e.g., personal computers (PCs), mobile phones (smartphones), tablet computing devices, smart watches, etc.), devices with different operating systems, devices with different screen sizes, and/or devices with different screen resolutions. For example, execution of a particular application may be appcasted between a mobile phone with a first instance of the application and a tablet with a second instance of the application.

In one or more embodiments, appcasting can be achieved with the state sync platform 224 and without the aide or presence of the state sync app 222. For example, the state sync platform 224 may be invoked or executed in response to user input (e.g., a long press of a button). The state sync platform 224 may perform one or more checks (e.g., the checks discussed above). Further, the state sync platform 224 may perform/acquire a screen capture (e.g., by taking/requesting a screenshot or retrieving/requesting an image frame from a frame buffer as discussed above).

In addition, the state sync platform 224 may cause the source application 316 to suspend execution. For example, because the state sync platform 224 may be a system level process in the framework layer 212 (thereby provided greater permissions and capabilities), the state sync platform 224 may have the permission and capability to suspend applications. In another example, the state sync platform 224 may request the operating system to suspend the source application's 316 execution. In yet another example, the state sync platform 224 may instruct the backup manager module 228 to back up the source application's 316 persistent/state data, whereby the backup manager module 228 may suspend the source application's 316 execution while a backup and/or appcast operation is completed.

Moreover, the state sync platform 224 may provide menus (e.g., the selection menu 307, warning message 309, appcast message 310, etc.). Because the state sync platform 224 may be a system level process, such menus may be displayed without causing a different application (i.e., an application different from the source application 316) to become the foreground application. Instead, a menu may be displayed "in-app" as a system menu. In some embodiments, the state sync platform 224 may still use the acquired screenshot as a background image. Furthermore, the state sync platform 224 may send the state data to one or more destination devices (e.g., via the server 120 using the communications network 140 or directly).

In some embodiments, an instance of the state sync platform 224 may execute on a destination device without the aide or presence of the state sync app 222. For example, the state sync platform 224 may receive a copy of state data from a source device, display related menus (e.g., the appcast approval prompt 322), provide the state data to the backup manager module 228, instruct the backup manager module 228 to perform a restore operation with the state data, and reinitialize the source application 316 on the destination device so that execution of the source application 316 will resume at the destination device.

Figure 4A:
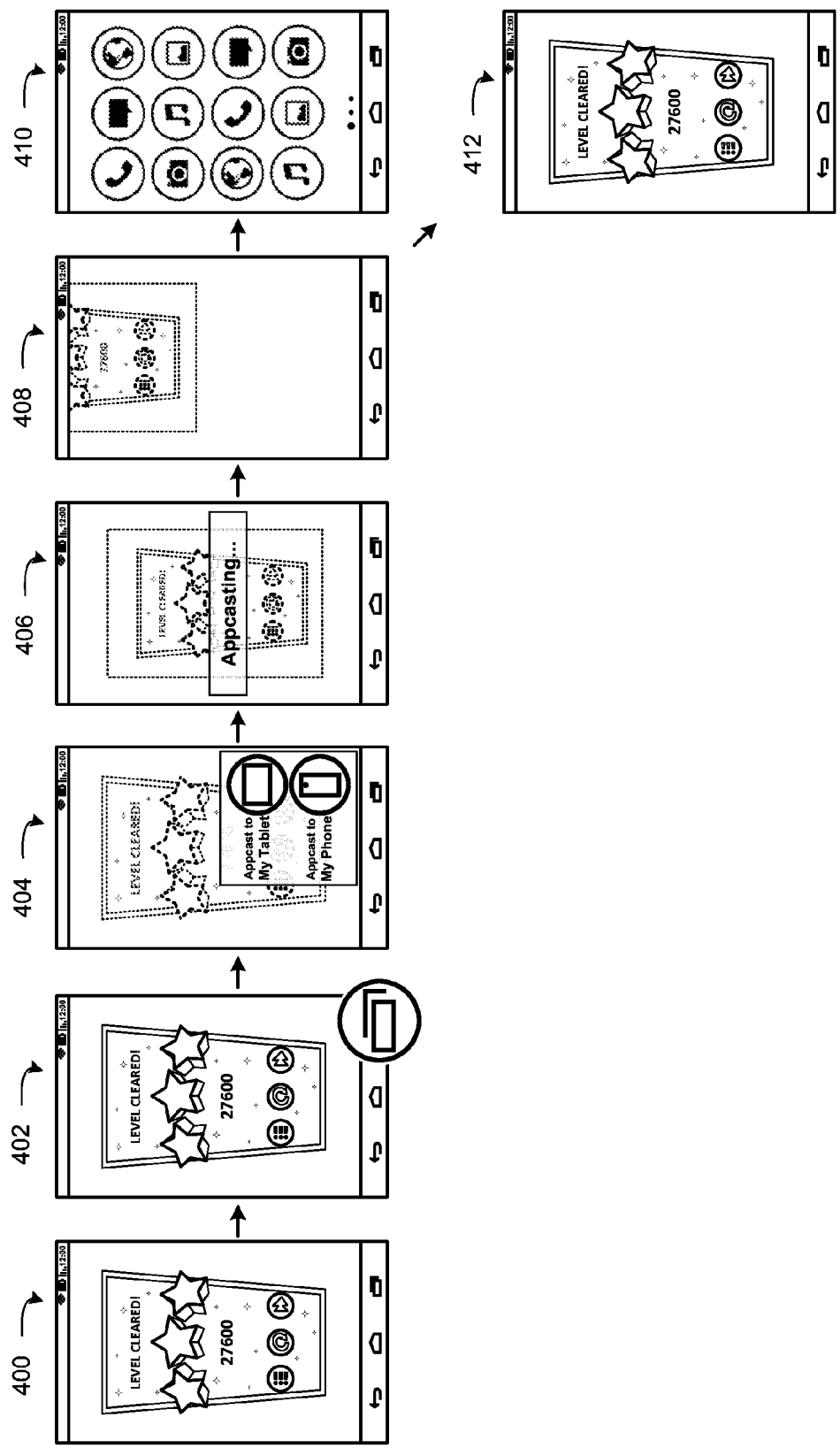
FIG. 4A illustrates an example appcasting operation, in accordance with one or more embodiments.

FIG. 4A illustrates an example appcasting operation, in accordance with one or more embodiments. In the example of FIG. 4A, a display 400 illustrates a display of an application (e.g., a video game) executing on a source device. A display 402 illustrates a press of a button (e.g., a long press as emphasized by the magnification effect) of the source device which may cause an initialization of an application cast procedure.

A display 404 illustrates an example of a selection menu that provides a listing of destination devices (e.g., destination devices that may be available and appropriate to receive the appcast). In some embodiments, a screenshot of the application (e.g., the video game) may be provided as a background of the selection menu. By providing a screenshot of the application during the appcast procedure, the user experience may be such that the user believes that he/she is still operating in the application while the appcast menus are displayed. The screenshot displayed as a background image may also provide context to the user as to which application will be casted.

A display 406 illustrates a message displayed while an appcast operation is being performed. A display 408 illustrates an example display of the source device after the appcast has been completed. In this example, the application is shown to slide upward and off of the display to indicate that the application has been casted. Subsequently, the source device may be returned to a "home screen" after the appcast operation has completed (as illustrated by a display 410). Alternatively, the source device may be returned to executing the application (e.g., the video game) after the appcast operation has completed (as illustrated by a display 412), where the application execution resumes to the point where it was interrupted at the display 402.

When the appcast operation is complete, execution of the application may be resumed at the destination device where execution was interrupted at the source device. For example, the destination device may resume execution at the execution point shown by display 402.

Figure 4B:
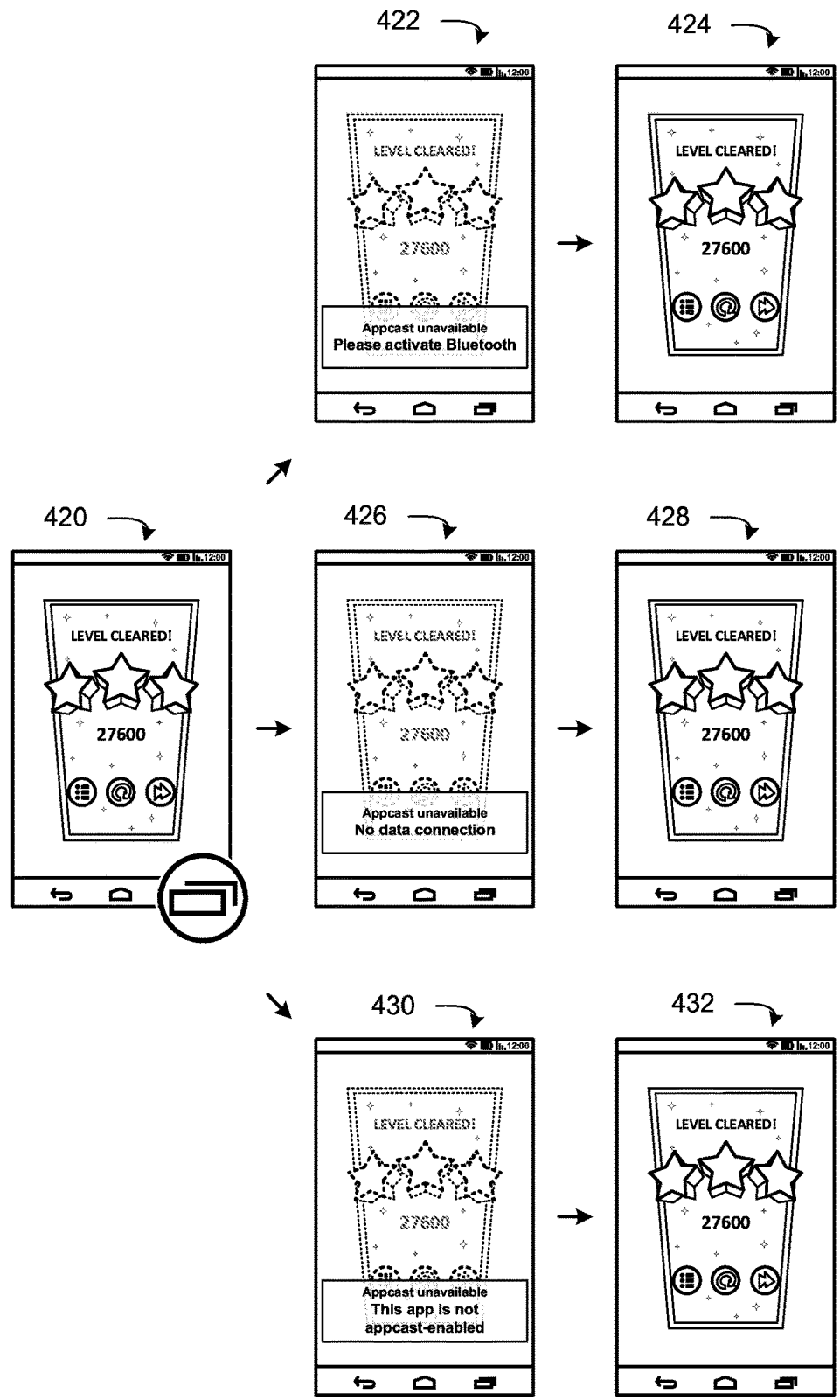
FIG. 4B illustrates example warning messages during an appcast operation, in accordance with one or more embodiments.

FIG. 4B illustrates example warning messages during an appcast operation, in accordance with one or more embodiments. In the example of FIG. 4B, a display 420 illustrates a display of an application (e.g., a video game) executing on a source device and a press of a button (e.g., a long press as emphasized by the magnification effect) of the source device which may cause an initialization of an application cast procedure.

After the application cast procedure is initialized, one or more checks may be performed. For example, modules that facilitate the appcasting operation may check whether appcasting communication means are enabled. Upon a determination that appcasting communication means are not enabled, a warning message may be displayed. For example, a display 422 illustrates a warning message indicating that appcasting communication means should be enabled (i.e., "Please activate Bluetooth"). Execution of the application may then be returned to the foreground, as illustrated by a display 424.

In another example, upon a determination that appcasting communication means are not available, a warning message may be displayed. For example, a display 426 illustrates a warning message indicating that appcasting communication means are not available (i.e., "No data connection"). Execution of the application may then be returned to the foreground, as illustrated by a display 428.

In yet another example, upon a determination that the application is not compatible with appcasting or is not enabled for appcasting, a warning message may be displayed. For example, a display 430 illustrates a warning message indicating that the application is not enabled for appcasting (i.e., "This app is not appcast-enabled"). Execution of the application may then be returned to the foreground, as illustrated by a display 432.

Figure 5A:
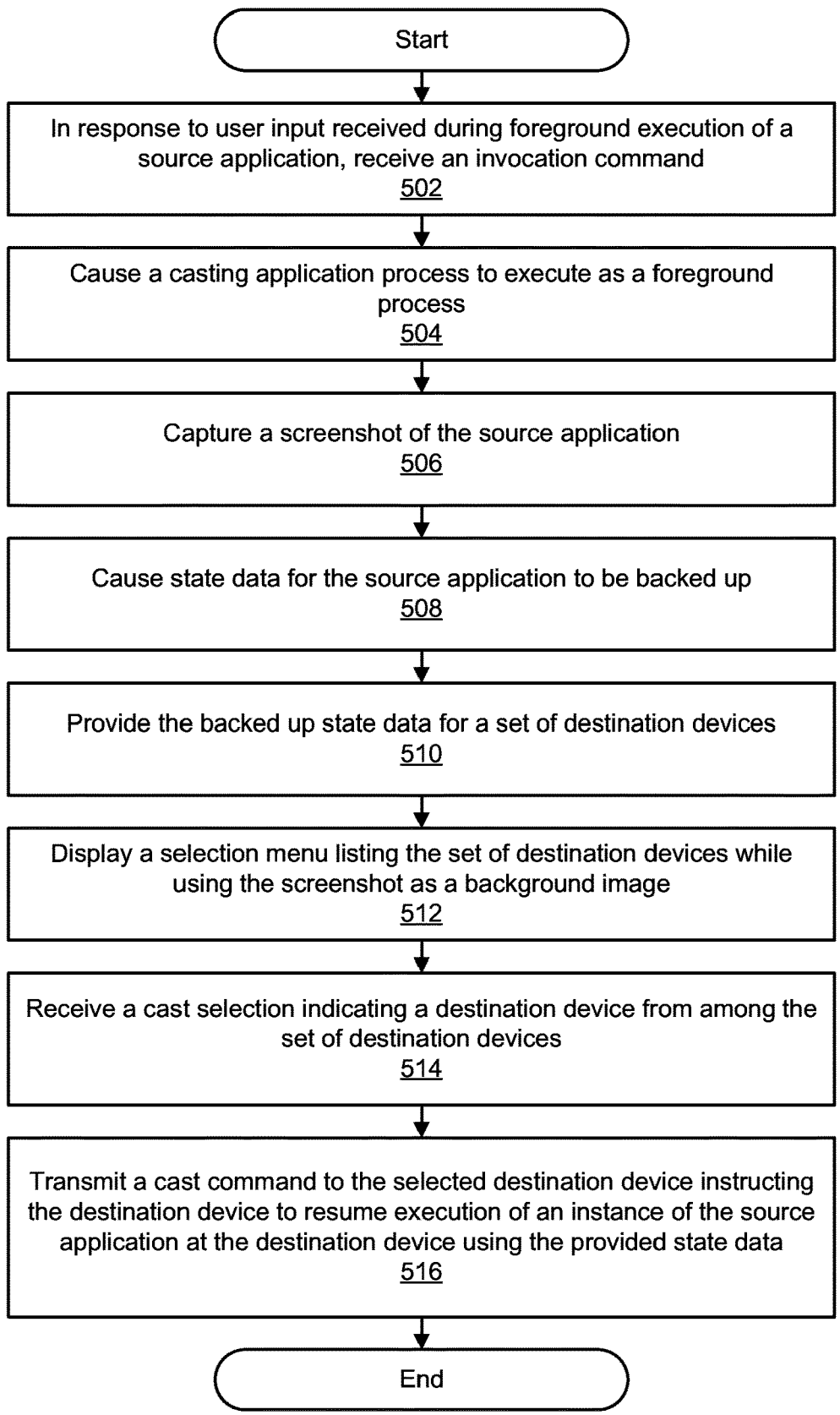
FIG. 5A shows a flowchart in accordance with one or more embodiments.

FIG. 5A illustrates steps of an example application appcasting method that can be performed by a source device to provide an appcast, in accordance with one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5A should not be construed as limiting the scope of the invention.

In step 502, an invocation command is received in response to user input received during foreground execution of a source application. For example, referring to FIG. 3A, user input may be received at the buttons 304A-306A.

In step 504, a casting application process is caused to execute as a foreground process. For example, referring to FIG. 2, the state sync app 222 may be caused to execute as the foreground application of the device 202. In some embodiments, instead of foreground execution of the state sync app 222, invocation of the state sync platform 224 may be caused. Because the source application 316 may no longer be the foreground process, it may completely or substantially suspend execution.

In step 506, a screenshot of the source application is captured. For example, referring to FIG. 3A-3B, a screenshot of the source application 316 depicting its most recently displayed foreground execution may be obtained (e.g., by the state sync app 222 and/or the state sync platform 224.

In step 508, state data for the source application is caused to be backed up. For example, referring to FIG. 2, the backup manager module 228 may be requested (e.g., by the state sync app 222 and/or the state sync platform 224) to back up the source application's state data from the persistent data repository 234 to the app state repository 236. The execution of the source application may be completely or substantially suspended (e.g., by the backup manager module 228 and/or the state sync platform 224).

In step 510, the backed up state data is provided for a set of destination devices. For example, referring to FIG. 1, the source device 102 (e.g., via the state sync app 222 and/or the state sync platform 224 of FIG. 2) may provide the state data to the one or more destination devices 104-110 (e.g., directly, via the communications network 140, and/or via the server 120).

In step 512, a selection menu listing the set of destination devices is displayed while using the screenshot as a background image. For example, referring to FIG. 3B, a selection menu 307 listing a set of destination devices is displayed (e.g., via the state sync app 222 and/or the state sync platform 224 of FIG. 2) using the screenshot of the source application 316 as a background image.

In step 514, a cast selection indicating a destination device from among the set of destination devices is received. For example, referring to FIG. 3B, a user may choose a listed destination device.

In some embodiments, additional information can be provided to the user (e.g., the warning message 309 of FIG. 3E or the displays 422, 426, and 430 of FIG. 4B). Upon selection of a particular destination device, information about the selected device can be displayed, for example, to indicate application version conflicts with an application that is currently running on the destination device. In some embodiments, state data is not transmitted (e.g., to the server 120 or directly to one or more other destination devices) until the cast selection is received. Alternatively, in some embodiments, the state data is pre-loaded (i.e., transferred/synchronized to one or more destination devices in advance of receiving the cast selection).

In step 516, a cast command is transmitted to the selected destination device instructing the destination device to resume execution of an instance of the source application at the destination device using the provided state data. In some embodiments, the cast command includes an instruction to initialize/re-initialize processing of a destination application (e.g., an instance of the source application on the destination device) using state data that has been transferred/synchronized to the destination device. In some embodiments, a check is performed to ensure that the state data has been completely/successfully transferred from the source device to the destination device, for example, before the state data is initialized/reinitialized on the destination device.

Figure 5B:
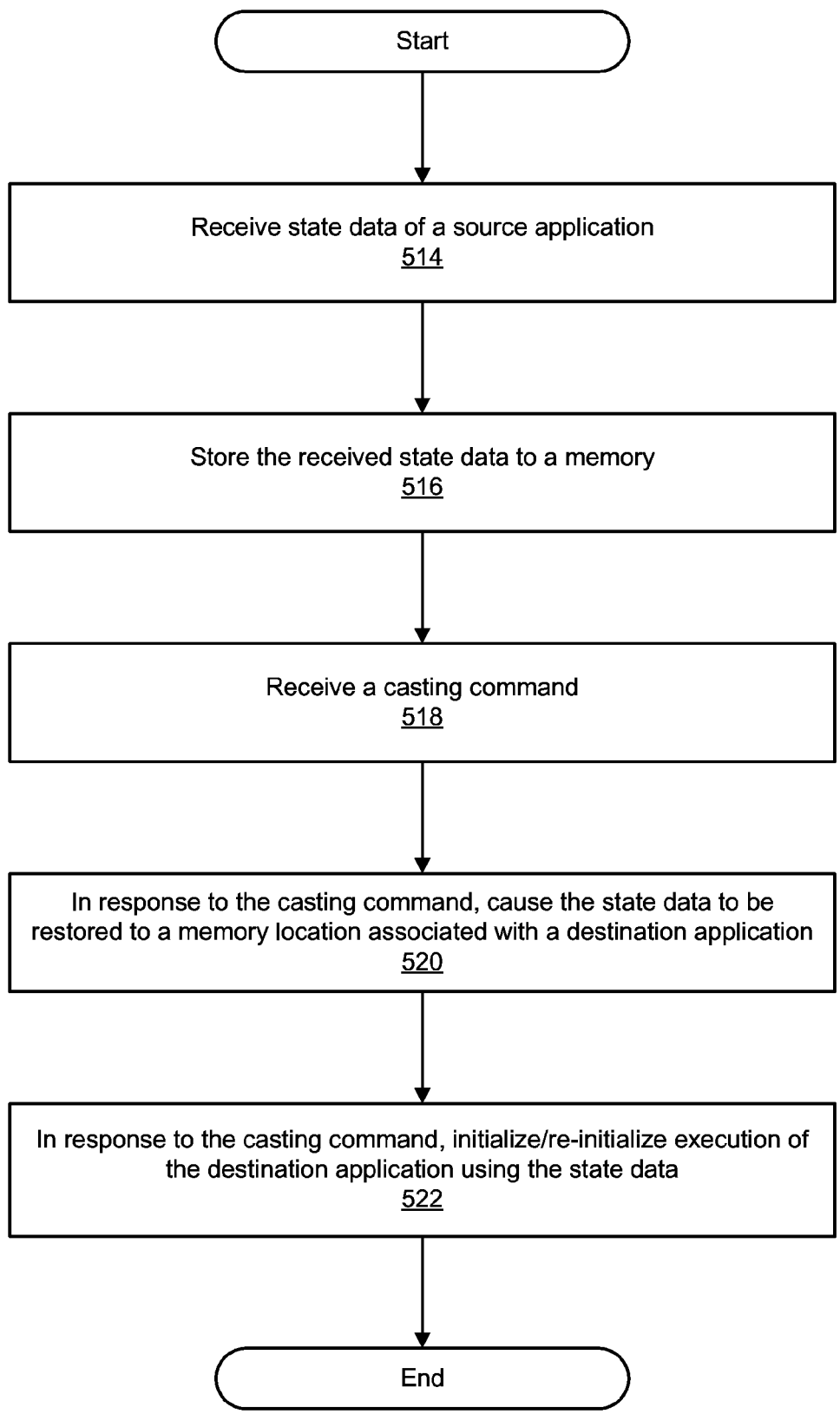
FIG. 5B shows a flowchart in accordance with one or more embodiments.

FIG. 5B illustrates steps of an example application casting method that can be performed by a destination device for receiving an appcast, in accordance with one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5B should not be construed as limiting the scope of the invention.

In step 514, the state data of a source application is received. For example, referring to FIG. 1, at least one of the destination devices 104-110 receives the state data (e.g., directly, via the communications network 140, and/or via the server 120).

In step 516, the received state data is stored to a memory. For example, referring to FIG. 2, an instance of the backup manager module 228 at the destination device may be requested (e.g., by an instance of the state sync app 222 and/or the state sync platform 224 at the destination device) to store the source application's state data in an app state repository 236 on the destination device and/or any other memory location from which it can later be retrieved.

In step 518, a casting command is received. For example, the casting command may instruct the destination device to resume execution of an instance of the source application at the destination device using the provided state data. In some embodiments, the cast command includes an instruction to initialize/re-initialize processing of a destination application (by the destination device) using state data that has been transferred/synchronized to the destination device.

In step 520, the state data is caused to be restored to a memory location associated with the destination application in response to the casting command. For example, referring to FIG. 2, an instance of the backup manager module 228 at the destination device may be requested (e.g., by an instance of the state sync app 222 and/or the state sync platform 224 at the destination device) to restore the source application's state data to a persistent data repository 234 on the destination device (e.g., in a memory location corresponding to the destination application).

In step 522, execution of the destination application is initialized/re-initialized using the state data in response to the casting command. Once the destination application is initialized/re-initialized, the destination application may seamlessly continue execution of the source application on the destination device.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

Embodiments of the invention may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments of the invention.

Figure 6:
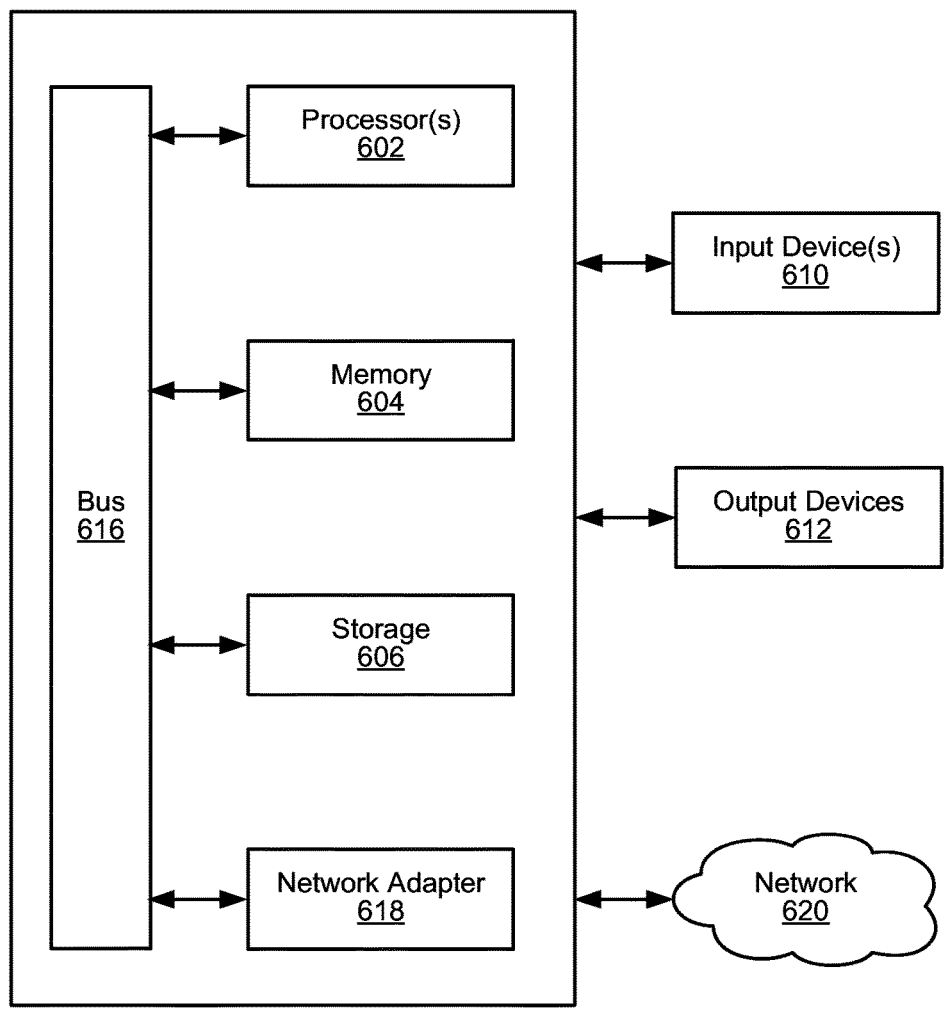
FIG. 6 shows a computer system in accordance with one or more embodiments.

For example, as shown in FIG. 6, system 600 may include one or more processor(s) 602 (e.g., computer processor(s)), a memory 604 (e.g., random access memory (RAM), cache memory, flash memory, etc.), one or more storage device(s) 606 (e.g., a hard disk, an optical drive such as a compact disk (CD) drive or digital versatile disk (DVD) drive, a flash memory stick, etc.), a bus 616, and numerous other elements and functionalities. The computer processor(s) 602 can utilize one or more integrated circuits for processing instructions. For example, processor(s) 602 may be one or more cores or micro-cores of a processor.

The computing system 600 can also include one or more input device(s) 610, such as a touchscreen, keyboard, mouse, microphone, touchpad, electronic pen, or any other type of input device. Further, system 600 may include one or more output device(s) 612, such as a screen (e.g., a liquid crystal display (LCD), a plasma display, touchscreen, cathode ray tube (CRT) monitor, projector, or other display device), a printer, external storage, or any other output device. Output devices 612 can further include ad hoc data transmission means, such as one or more radio frequency (RF) modules, such as a Bluetooth® or WiFi radio. In some embodiments, output devices 612 can include other communication modules, such as one or more optical (e.g., infrared) communication modules, etc.

The system 600 can be connected to a network (e.g., a local area network (LAN), a wide area network (WAN) such as the Internet, mobile network, or any other type of network) using network adapter 618. The input and output device(s) can be locally or remotely connected (e.g., via the network) to the processor(s) 602, memory 602, and/or storage device(s) 606.

One or more elements of the aforementioned system 600 can be located at a remote location and connected to the other elements over a network. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein can be implemented in a cloud computing environment. Cloud computing environments may provide various services and applications via a communications network, such as the Internet. These cloud-based services (e.g., software as a service, platform as a service, infrastructure as a service, etc.) can be accessible through a Web browser or other remote interface.

One or more elements of the above-described systems (e.g., FIGS. 1 and 2) may also be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1 and 2) and/or flowcharts (e.g., FIGS. 5A and/or 5B). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

It is understood that a "set" can include one or more elements. It is also understood that a "subset" of the set may be a set of which all the elements are contained in the set.

In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. A computer-implemented method comprising:
   receiving, in response to user input received during an execution of a source application executing as a foreground process on an operating system of a source computing device, an invocation command;
   in response to the invocation command:
      causing a casting application process to execute as a foreground process of the operating system of the source computing device and thereby cause the source application to execute as a background process of the operating system of the source computing device, and
      causing the source application to backup state data of the source application that indicates a set of properties of the source application execution at a first time;
   capturing a screenshot of the source computing device executing the source application;
   transmitting the state data to a set of destination computing devices via a server that synchronizes the state data with the set of destination computing devices;
   displaying a selection menu representing each of the set of destination computing devices using the screenshot as a background image, wherein the selection menu is provided by the casting application process executing as a foreground process; and
   transmitting, in response to a user selection of a destination computing device from the selection menu, a cast command to the destination computing device instructing the destination computing device to execute the source application on the destination computing device using the state data, whereby a user of the destination computing device can continue uninterrupted execution of the source application on the destination computing device at a second time.

2. The computer-implemented method of claim 1, further comprising causing the source application to resume execution as a foreground process after transmitting the cast command to the destination computing device.

3. The computer-implemented method of claim 1, further comprising terminating execution of the source application after transmitting the cast command to the destination computing device.

4. The computer-implemented method of claim 1, wherein the screenshot of the source computing device is captured by the operating system of the source computing device.

5. The computer-implemented method of claim 1, wherein the screenshot of the source computing device is captured by retrieving an image frame from a frame buffer of the source computing device.

6. The computer-implemented method of claim 1, further comprising:
   determining the set of destination computing devices based on appcasting criteria, wherein the appcasting criteria comprises at least one selected from a group consisting of application availability on destination computing devices, application version compatibility on destination computing devices, user preferences for appcasting, proximity of destination computing devices, and connectivity of destination computing devices.

7. A system, comprising:
   a computer processor;
   a network adapter that facilitates communication with a server and a group of computing devices associated with a user; and
   a memory having instructions, which when executed by the processor, enable the processor to:
      cause a source application executing as a foreground process in an operating system of a source computing device to store state data of the source application;
      transmit the stored state data of the source application to a set of destination computing devices;
      display a selection menu indicating a subset of destination computing devices from among the set of destination computing devices;
      receive a cast selection via the selection menu, wherein the cast selection indicates a destination computing device from among the subset of destination computing devices; and
      transmit a cast command to the destination computing device indicated by the cast selection, wherein the cast command is configured to instruct the destination computing device to execute the source application on the destination computing device using the state data, whereby a user of the destination computing device can continue uninterrupted execution of the source application on the destination computing device.

8. The system of claim 7, wherein the memory further includes instructions that, when executed by the processor, enable the processor to:
   receive an invocation command in response to user input received during execution of the source application as a foreground process; and
   in response to the invocation command, cause a casting application process to execute as a foreground process of the operating system, and thereby cause the source application to execute as a background process of the operating system and cause the source application to store state data of the source application.

9. The system of claim 7, wherein the memory further includes instructions that, when executed by the processor, enable the processor to:
   issue a backup command, in response to user input received during execution of the source application as a foreground process, that causes the source application to back up state data of the source application.

10. The system of claim 7, wherein the memory further includes instructions that, when executed by the processor, enable the processor to:
    conduct initial determinations comprising at least one selected from a group consisting of determining whether an application is executing as a foreground process, determining what application is executing as a foreground process, determining a version of an application executing as a foreground process, determining whether an application executing as a foreground process supports appcasting, and determining whether user preferences allow for appcasting of an application executing as a foreground process.

11. The system of claim 7, wherein the memory further includes instructions that, when executed by the processor, enable the processor to:

capture a display frame of the source application depicting the source application executing as a foreground process; and display the display frame as a background image for the selection menu.

12. The system of claim 7, wherein the memory further includes instructions that, when executed by the processor, enable the processor to:

determine the subset of destination computing devices based on physical proximity of each destination computing device of the set of destination computing devices to the source computing device.

13. The system of claim 7, wherein the memory further includes instructions that, when executed by the processor, enable the processor to:

determine the subset of destination computing devices based on user preferences about each destination computing device of the set of destination computing devices.

14. A non-transitory computer-readable storage medium comprising a plurality of instructions configured to execute on at least one computer processor to enable the computer processor to:

cause a source application executing as a foreground process in an operating system of a source computing device to store state data of the source application;

transmit the stored state data of the source application for a set of destination computing devices;

display a selection menu indicating a subset of destination computing devices from among the set of destination computing devices;

receive a cast selection via the selection menu, wherein the cast selection indicates a destination computing device from among the subset of destination computing devices; and transmit a cast command to the destination computing device based on the cast selection, wherein the cast command is configured to instruct the destination computing device to execute the source application on the destination computing device using the state data, whereby a user of the destination computing device can continue uninterrupted execution of the source application on the destination computing device.

15. The non-transitory computer-readable storage medium of claim 14, wherein the instructions further enable the computer processor to:

request application version information of each destination computing device of the set of destination computing devices;

determine application compatibility of the source application with the set of destination computing devices based on the application version information; and determine the subset of destination computing devices based on the application compatibility.

16. The non-transitory computer-readable storage medium of claim 14, wherein the instructions further enable the computer processor to:

calculate an initial hash value of the state data at a first time substantially immediately after the source application was caused to store the state data;

calculate a current hash value of the state data at a second time after the first time;

compare the initial hash value with the current hash value; and upon a determination that the initial hash value is not equal to the current hash value, re-transmit the state data of the source application for the set of destination computing devices.

17. The non-transitory computer-readable storage medium of claim 14, wherein transmitting the state data further comprises:

transmitting the state data to a remote server, wherein the remote server is operable to synchronize the state data to the set of destination computing devices.

18. The non-transitory computer-readable storage medium of claim 14, wherein transmitting the state data further comprises:

transmitting the state data via an ad hoc communication channel to at least one destination computing device of the set of destination computing devices.

19. The non-transitory computer-readable storage medium of claim 14, wherein the instructions further enable the computer processor to:

transmit the stored state data of the source application for the set of destination computing devices before receiving the cast selection.

20. The non-transitory computer-readable storage medium of claim 14, wherein the instructions further enable the computer processor to:

request a confirmation message from the destination computing device confirming that the destination computing device has received the entirety of the state data; and upon receiving the confirmation message, transmit the cast command to the destination computing device.

21. The non-transitory computer-readable storage medium of claim 14, wherein causing the source application to store state data comprises:

causing a process that displays the selection menu to execute as a foreground process of the operating system in response to a user event; and causing the source application to execute as a background process of the operating system.

22. The non-transitory computer-readable storage medium of claim 14, wherein the instructions further enable the computer processor to request the operating system to instruct the source application to store the state data in response to a user event.

23. A system comprising:

a computer processor;

a network adapter that facilitates communication with a server and a group of computing devices associated with a user; and a memory having instructions, which when executed by the processor, enable the processor to:

receive state data of a source application of a source computing device, wherein the state data is stored by the source computing device during an execution of the source application as a foreground process in an operating system of the source computing device;

store the state data on a destination computing device; and in response to receiving a casting command, reinitialize and execute a destination application on the destination computing device using the state data, the destination application being an instance of the source application, wherein the casting command is received in response to a cast selection at the source computing device, wherein the cast selection is received via a selection menu displayed at the source computing device, the selection menu indicating a set of destination computing devices, the cast selection indicating the destination computing device from among the set of destination computing devices, whereby a user of the destination computing device can continue uninterrupted execution of the source application on the destination computing device.

24. The system of claim 23, wherein the state data is received via an ad hoc communication channel with the source computing device.

25. The system of claim 23, wherein the state data is received via a remote server operable to synchronize the state data to the destination computing device.

26. The system of claim 23, wherein storing the state data on the destination computing device overwrites preexisting state data in a storage location of the destination application.

27. The system of claim 26, wherein the memory further includes instructions that, when executed by the processor, enable the processor to:
    back up the preexisting state data in the storage location before it is overwritten by the state data of the source application.

\* \* \* \* \*